(12) United States Patent
Mohanta et al.

(10) Patent No.: US 11,708,640 B2
(45) Date of Patent: Jul. 25, 2023

(54) SYSTEMS AND METHODS FOR AQUEOUS RECOVERY OF LEAD FROM LEAD ACID BATTERIES WITH REDUCED ELECTROLYTE DEMAND

(71) Applicant: Aqua Metals Inc., Reno, NV (US)

(72) Inventors: Samaresh Mohanta, Dublin, CA (US); Joshua Hufford, McCarran, NV (US)

(73) Assignee: Aqua Metals Inc., McCarran, NV (US)

( * ) Notice: Subject to any disclaimer, the term of this patent is extended or adjusted under 35 U.S.C. 154(b) by 18 days.

(21) Appl. No.: 17/618,325

(22) PCT Filed: Jun. 12, 2020

(86) PCT No.: PCT/US2020/037539
§ 371 (c)(1),
(2) Date: Dec. 10, 2021

(87) PCT Pub. No.: WO2020/252343
PCT Pub. Date: Dec. 17, 2020

(65) Prior Publication Data
US 2022/0341051 A1    Oct. 27, 2022

Related U.S. Application Data

(60) Provisional application No. 62/860,928, filed on Jun. 13, 2019.

(51) Int. Cl.
*C25C 1/18* (2006.01)
*C01G 21/06* (2006.01)
(Continued)

(52) U.S. Cl.
CPC ............. *C25C 1/18* (2013.01); *C01G 21/06* (2013.01); *C22B 1/005* (2013.01); *C22B 1/11* (2013.01); *C22B 13/045* (2013.01); *H01M 10/54* (2013.01)

(58) Field of Classification Search
CPC ........... C25C 1/18; C01G 21/06; C22B 1/005; C22B 1/11; C22B 13/045; H01M 10/54
See application file for complete search history.

(56) References Cited

U.S. PATENT DOCUMENTS 1,682,562 A    8/1928    Hill
4,269,811 A    5/1981    Striffler et al.
(Continued)

FOREIGN PATENT DOCUMENTS

CN    1248801 A    3/2000
CN    105981212 A    9/2016
(Continued)

OTHER PUBLICATIONS

Gavrichev et al., "Thermal Transformations of Lead Oxides," Journal of Thermal Analysis and Calorimetry, 2008; 92(3):857-863.
(Continued)

*Primary Examiner* — Zulmariam Mendez
(74) *Attorney, Agent, or Firm* — Umberg Zipser LLP

(57) ABSTRACT

Lead is recovered from lead paste of a lead acid battery in a continuous and electrochemical lead recovery process. In especially preferred aspects, lead paste is processed to remove residual sulfates, and the so treated lead paste is subjected to a thermal treatment step that removes residual moisture and reduces lead dioxide to lead oxide. Advantageously, such pretreatment will avoid lead dioxide accumulation and electrolyte dilution.

20 Claims, 6 Drawing Sheets

(51) Int. Cl.
*C22B 1/00* (2006.01)
*C22B 1/11* (2006.01)
*C22B 3/00* (2006.01)
*H01M 10/54* (2006.01)

(56) References Cited

U.S. PATENT DOCUMENTS

| | | | |
|---|---|---|---|
| 7,507,496 | B1 | 3/2009 | Kinsbursky et al. |
| 8,323,376 | B2 | 12/2012 | Kumar et al. |
| 8,715,615 | B2 | 5/2014 | Smith et al. |
| 9,257,731 | B2 | 2/2016 | Liu et al. |
| 9,828,653 | B2 | 11/2017 | Pan et al. |
| 9,828,654 | B2 | 11/2017 | Pan et al. |
| 2017/0271725 | A1 | 9/2017 | Pan et al. |

FOREIGN PATENT DOCUMENTS

| | | |
|---|---|---|
| CN | 107268028 A | 10/2017 |
| CN | 107732350 A | 2/2018 |
| CN | 108603242 A | 9/2018 |
| CN | 109763143 A | 5/2019 |
| JP | 2017503087 A | 1/2017 |
| WO | 9944942 A1 | 9/1999 |
| WO | 9966105 A1 | 12/1999 |
| WO | 2017096209 A1 | 6/2017 |

OTHER PUBLICATIONS

Ma et al., "Preparation of high-purity lead oxide from spent lead paste by low temperature burning and hydrometallurgical processing with ammonium acetate solution," RSC Advances, 2016; 6:21148-21155.

Zhu et al., "A green recycling process of the spent lead paste from discarded lead-acid battery by a hydrometallurgical process," Waste Management & Research, 2019; 37(5):508-515.

First Examination Report for India Application No. 202127058866 dated Jan. 10, 2023, 6 pgs.

First Office Action for China Application No. 202080057142.5 dated Dec. 28, 2022, 14 pgs.; and English translation, 19 pgs.

SYSTEMS AND METHODS FOR AQUEOUS RECOVERY OF LEAD FROM LEAD ACID BATTERIES WITH REDUCED ELECTROLYTE DEMAND

CROSS-REFERENCE TO RELATED APPLICATIONS

This application claims priority to U.S. Provisional Application No. 62/860,928 filed on Jun. 13, 2019, the entire contents of which are incorporated herein by reference.

FIELD OF THE INVENTION

The field of the invention is improved processes for recovery of lead from desulfurized lead paste using an electrolytic process, and especially as it relates to conservation of electrolyte and water balance in such recycling processes.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Various efforts have been made to move away from smelting operations in recycling lead acid batteries (LABs) and to use more environmentally friendly solutions. For example, U.S. Pat. No. 4,927,510 teaches recovering substantially all lead in pure metal form from battery sludge after a desulfurization process. In another example, Canadian Patent No. 1,310,837 also teaches recovering lead in metal form from a desulfurized paste. The paste is leached with an acid suitable for electrowinning and insoluble $PbO_2$ is reduced using hydrogen peroxide. Unfortunately, the '510 patent and the '837 patent require use of a fluorine containing electrolyte (e.g., fluoboric or fluosilic acid), which is equally problematic.

To overcome some of the difficulties associated with fluorine containing electrolyte, desulfurized lead active materials have been dissolved in methane sulfonic acid as described in U.S. Pat. Nos. 5,262,020 and 5,520,794. On the other hand, lead recovery can also be performed in methane sulfonic acid without desulfurization as described in International Patent Publication No. WO 2015/077227. Here, it had been found that the inclusion of chelating agents with solvents (e.g., EDTA) such as MSA at acidic pH improves solubility of lead oxides and lead sulfate salts, permitting recovery of lead by electrodeposition from such solvents. As will be appreciated, lead dioxide remained insoluble in such solvents. Moreover, where the lead materials were previously desulfurized (e.g., using sodium hydroxide to form soluble sodium sulfate), so pretreated lead paste still comprised significant quantities of residual sulfate and aqueous desulfation medium, which in turn leads to contamination and dilution of downstream electrolyte used in the lead recovery.

Lead dioxide can be reduced using hydrogen peroxide as is described in U.S. Pat. No. 8,409,421, which teaches an electrolytic process for recovering lead from desulfurized lead paste. Here, the lead paste is leached with a solution comprising ammonium chloride to form a two-phase reaction product. The solid phase of the reaction product is leached with hydrogen peroxide to reduce insoluble $PbO_2$ and form a second two-phase reaction product. The liquid phases of the two reaction products are subject to electrolysis to form metallic lead. However, while lead dioxide quantities are substantially reduced in such liquid processes, the water requirement is not insignificant and the presence of the water dilutes the electrolyte, thereby increasing the need for and cost of electrolyte. Similar issues are also encountered and often amplified in continuous lead recovery processes as described, for example, in applications US 2017/0352927, US 2018/0127852, and US 2018/0355494.

Thus, even though numerous methods for lead recycling using electrolytes are known in the art, all or almost all of them, suffer from one or more disadvantages. Most notably, while these processes avoid environmental concerns associated with smelting operations, new difficulties with electrolyte management and lead dioxide reduction have arisen. Therefore, there is still a need for improved methods for smelterless recycling of lead acid battery paste, especially in a manner that avoids lead dioxide accumulation, electrolyte contamination, and/or electrolyte dilution.

SUMMARY OF THE INVENTION

The inventive subject matter is directed to various systems and methods that avoid lead dioxide accumulation and electrolyte dilution and contamination, particularly in a smelterless electrochemical lead recovery process.

In one aspect of the inventive subject matter, the inventor contemplates a method of reducing electrolyte loss in an electrochemical lead recovery operation that recovers metallic lead from desulfurized lead paste of a lead acid battery. Such method has a step of providing the desulfurized lead paste, wherein the desulfurized lead paste includes lead dioxide, lead oxide, lead hydroxide, and/or lead carbonate, and further comprises residual sulfate. The method includes a washing step, wherein the desulfurized lead paste is washed with water thereby forming a washed desulfurized lead paste having residual water. The method includes heating the washed desulfurized lead paste to reduce the residual water to equal or less than 10 wt % and to reduce at least 50% of the lead dioxide to lead oxide, thereby forming dried decomposed desulfurized lead paste. In yet another step, the dried decomposed desulfurized lead paste is combined with a recycled electrolyte to form a lead ion enriched electrolyte, and in a still further step, the lead ion enriched electrolyte is subjected to an electrochemical lead recovery operation to thereby recover metallic lead on a cathode and generate the recycled electrolyte.

For example, the desulfurized lead paste may be desulfurized using an aqueous base, and/or may include residual lead sulfate in an amount of between 0.1-10 wt %. Where desired, it is also contemplated to subject the desulfurized lead paste to a step of filter pressing before the step of heating.

Further embodiments include removing the residual water from the washed desulfurized lead paste. Preferably, the removal of the water from the washed desulfurized lead paste includes filter pressing and/or using waste heat from the step of heating the washed desulfurized lead paste.

In some embodiments, the step of washing the desulfurized lead paste reduces the amount of residual sulfate by at least 50%, at least 70%, or at least 90% in the washed desulfurized lead paste compared to the desulfurized lead paste prior to washing.

In some embodiments, the step of heating the desulfurized lead paste reduces the residual water to equal or less than 10 wt %, equal or less than 5 wt %, or equal or less than 2 wt %, while the step of heating the desulfurized lead paste may reduce at least 25%, at least 50%, at least 70%, or at least 90% of the lead dioxide to lead oxide. In further embodiments, the step of heating is performed in a kiln such that the material has a temperature of between 400-700° C. or between 500-560° C. at the end of the heating. For example, heating may be performed for a time of between 5-15 minutes (e.g., as measured between entering the feed end or a rotary kiln and exiting the product end of the rotary kiln). It is further contemplated that the recycled electrolyte may comprise an alkane sulfonic acid, such as methane sulfonic acid.

Optionally, the method of reducing electrolyte loss includes a step of removing solids from the lead ion enriched electrolyte and/or the recycled electrolyte. For example, the solids include at least one of lead dioxide, lead sulfate, or grid lead.

Typically, but not necessarily, the electrochemical lead recovery operation uses a moving cathode. In such case, the electrochemical lead recovery operation may include a step of reducing the lead ions on one portion of a cathode while at the same time metallic lead is removed from another portion of the cathode. As needed or desired, residual lead sulfate may be removed from the lead ion enriched electrolyte and/or the recycled electrolyte. Preferably, the metallic lead has purity of at least 95 wt %, or at least 97 wt %, or at least 99 wt %. Additionally, the recovered metallic lead has a density of less than 5 $g/cm^3$ or less than 2 $g/cm^3$.

In another aspect of the inventive subject matter, the inventor contemplates a method of reducing lead dioxide build-up in an electrochemical lead recovery operation that recovers metallic lead from lead paste of a lead acid battery and uses and recycles an electrolyte in which lead dioxide is insoluble. Preferably, such method will include a step of providing the lead paste, wherein the lead paste comprises lead dioxide and no more than 2.0 wt % residual sulfate, and a further step of heating the lead paste to reduce at least 25% of the lead dioxide to lead oxide, thereby forming decomposed lead paste, and another step of combining the decomposed lead paste with a recycled electrolyte to form a lead ion enriched electrolyte. In yet another step, the lead ion enriched electrolyte is subjected to an electrochemical lead recovery operation to thereby recover metallic lead on a cathode and generate the recycled electrolyte.

In some embodiments, the lead paste is a desulfurized lead paste. Contemplated lead paste may further comprise residual water in an amount of at least 10 wt %. As will be appreciated, the lead paste may be subjected to a step of filter pressing before the step of heating.

In further embodiments, the step of heating the lead paste reduces at least 60% or at least 70% or at least 90% of the lead dioxide to lead oxide. Moreover, the step of heating the lead paste may also reduce the residual water to equal or less than 10 wt %, equal or less than 5 wt %, or equal or less than 2 wt %. Heating may be performed in a kiln such that the material has a temperature of between 400-700° C. or between 500-560° C. at the end of the heating. Preferably, but not necessarily, the recycled electrolyte comprises an alkane sulfonic acid (e.g., methane sulfonic acid).

In further embodiments, the method of reducing lead dioxide build-up in an electrochemical lead recovery may include a step of removing solids from the lead ion enriched electrolyte and/or the recycled electrolyte. For example, the solids include at least one of lead dioxide, lead sulfate, or grid lead.

In yet further embodiments, the electrochemical lead recovery operation uses a moving cathode. In such case, the electrochemical lead recovery operation may include a step of reducing the lead ions on one portion of a cathode while at the same time metallic lead is removed from another portion of the cathode. Where desired, contemplated methods also include a step of removing residual lead sulfate from the lead ion enriched electrolyte and/or the recycled electrolyte. Most typically, the metallic lead has a purity of at least 95 wt %, or at least 97 wt %, or at least 99 wt %. The recovered metallic lead has a density of less than 5 $g/cm^3$ or a density of less than 2 $g/cm^3$. If desired, methods presented herein may also include a further step of ingoting the metallic lead. Moreover, it is contemplated that water can be collected (and re-used) from the step of heating or from a step of filter pressing the lead paste before the step of heating.

In still other embodiments, a method of preserving an effective concentration of an electrolyte and reducing lead dioxide build-up in the electrolyte in a continuous electrochemical lead recovery operation that recovers metallic lead from desulfurized lead paste of a lead acid battery, includes providing the desulfurized lead paste, wherein the desulfurized lead paste comprises lead dioxide, lead hydroxide, and/or lead carbonate, and further comprises residual sulfate. The method further includes washing the desulfurized lead paste thereby forming a washed desulfurized lead paste comprising residual water present in the desulfurized lead paste of between about 10 to 30 wt %. This washed desulfurized lead paste is then heated to reduce the residual water to equal or less than 10 wt % and to reduce at least 50% of the lead dioxide to lead oxide, thereby forming a dried decomposed desulfurized lead paste. The dried decomposed desulfurized lead paste is subsequently combined with the electrolyte to form a lead ion enriched electrolyte. This lead ion enriched electrolyte is subjected to electrochemical lead recovery operation on a cathode on which metallic lead is formed and recovered, and a recycled electrolyte solution is formed.

In additional embodiments, the method of preserving an effective concentration of an electrolyte and reducing lead dioxide build-up in the electrolyte in a continuous electrochemical lead recovery operation that recovers metallic lead from desulfurized lead paste also includes heating the washed desulfurized lead paste in a kiln, wherein the washed desulfurized lead paste has any shape and is not more than 1 inch in any dimension.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
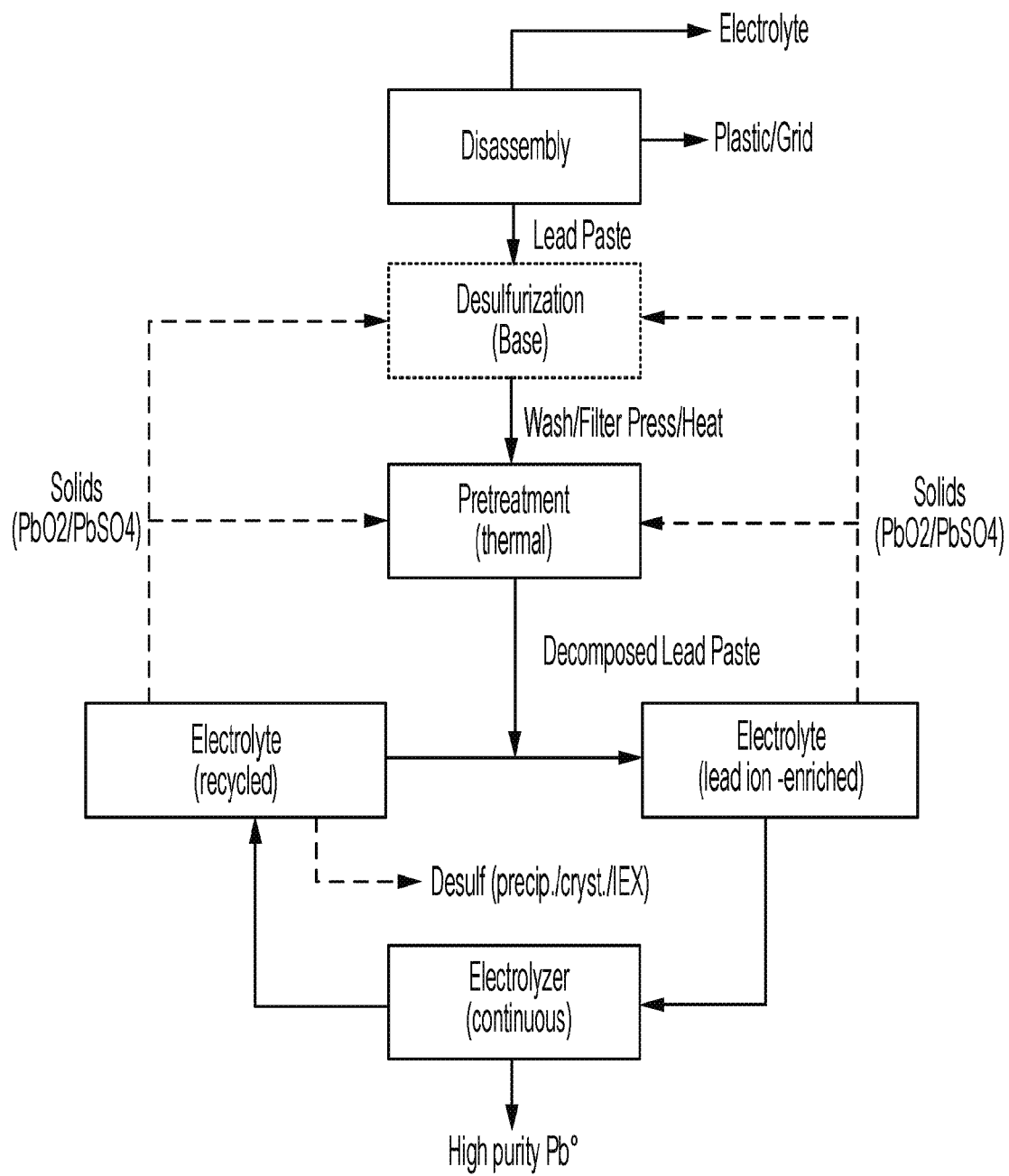
FIG. 1 is an exemplary schematic of a lead recycling process according to the inventive subject matter.

In most common processes for disassembly of lead acid batteries (LAB) lead paste, plastic, and grid lead are produced. Hydro-separation treatment of these components then allows for the separation of most of the plastic and the grid lead, thereby isolating the lead paste. Conventional treatments of lead pastes for recovery of metallic lead typically includes desulfurization of the lead paste followed by acid neutralization with an acidic solvent. However, in practice, the desulfurized lead pastes still include significant quantities of residual sulfate from dissolved sodium sulfate as well as other residual solids (e.g., lead hydroxide, lead oxide, lead dioxide, grid lead, and plastic). While acid neutralization of desulfurized paste will readily dissolve the lead hydroxide (Pb(OH)2) and lead oxide (PbO), the residual lead dioxide ($PbO_2$), residual grid lead, and residual plastics remain insoluble and the residual sulfate (e.g., sodium sulfate) will react with methane sulfonic acid (MSA) in an electrolyte to form Na-MSA and lead sulfate, thereby forming a precipitate and reducing the available MSA in the electrolyte solvent.

Furthermore, considering that preferred lead recovery operations recycle the electrolyte in a continuous process, lead dioxide in the desulfurized lead paste accumulates in the electrolyte solution, thereby further limiting the effectiveness of the recycled electrolyte.

While washing the desulfurized lead paste (e.g., with water) can reduce the amount of residual sulfates, the wash water now present in the lead paste will dilute the electrolyte solution, thereby decreasing the effectiveness of the recycled electrolyte solution. More specifically, the residual moisture (typically about 10-30 wt %) from an additional wash step significantly dilutes the electrolyte and as such, requires additional alkane sulfonic acid (e.g., MSA) or water removal from the diluted electrolyte, thereby thwarting the usefulness of recycling the electrolyte solution.

With respect to other conventional strategies to address insoluble residual solids in desulfurized or non-desulfurized lead paste, thermal processing (e.g., heating) can be used to convert the acid insoluble $PbO_2$ to the acid soluble PbO. See, e.g., Caulder and Simon, 1974, *J. Electrochem. Soc.*, 121: 1546-1551. However, the residual sulfates in the lead paste are not conducive to thermal processing as they produce noxious gases and insoluble lead sulfate, thereby rendering lead paste containing sulfates unsuitable for thermal processing. In addition, the presence of residual plastic components in most desulfurized or non-desulfurized lead paste further compounds the difficulties with thermal processing.

Advantageously, the contemplated subject matter includes a process of washing (e.g., with water) desulfurized lead paste having residual solids, to thereby produce a washed lead paste having decreased residual solids, and in particular, a washed lead paste having decreased or removed residual sulfates. For example, the desulfurized lead paste may be subjected to a wash step to remove base solution with dissolved sodium sulfate (e.g., where desulfurization with sodium hydroxide or carbonate was employed). Typically, the washing step reduces the amount of residual sulfates in the desulfurized lead paste by at least 50 wt %, or at least 70 wt %, or at least 90 wt % compared to a lead paste that has not been washed (e.g., with water). More specifically, the washing step reduces the amount of residual sulfates in the desulfurized lead paste by at least 50 wt %, 55 wt %, 60 wt %, 65 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, or 90 wt %. Alternatively, or additionally, the washing step may reduce the amount of residual sulfate in the desulfurized lead paste to an amount of between about 0.1 wt % to about 10 wt %, of between 0.1 to 2 wt %, of between 0.1 to 1 wt %, of between 0.1 to 0.7%, of between 0.5 to 0.7 wt %, or of between 0.1 to 0.5 wt %. More specifically, the washed desulfurized lead paste contains residual sulfates in an amount of between about not more than 5 wt %, not more than 4 wt %, not more than 3 wt %, not more than 2 wt %, not more than 1.9 wt %, not more than 1.8 wt %, not more than 1.7 wt %, not more than 1.6 wt %, not more than 1.5 wt %, not more than 1.4 wt %, not more than 1.3 wt %, not more than 1.2 wt %, not more than 1.1 wt %, not more than 1 wt %, not more than 0.9 wt %, not more than 0.8 wt %, not more than 0.7 wt %, not more than 0.6 wt %, not more than 0.5 wt %, not more than 0.4 wt %, not more than 0.3 wt %, not more than 0.2 wt %, or not more than 0.1 wt %. Typically, the washed desulfurized lead paste contains residual sulfates in an amount of between about 0.5 wt % to 2.5 wt %, and most typically, not more than 2.0 wt %.

Notably, the washed lead paste includes the electrolyte diluting wash solution; however, because the residual sulfates have been removed/decreased, the washed lead paste can now be heated by thermal processing to thereby remove the additional wash solution (e.g., water) and convert at least 25% and up to at least 90% of the lead dioxide ($PbO_2$) of the washed lead paste to lead oxide (PbO). Accordingly, the contemplated method effectively allows for reducing electrolyte loss/dilution and reducing build-up of acid-insoluble lead dioxide (and lead sulfate) in a lead recovery operation for recovering metallic lead from a washed desulfurized lead paste. Additionally, the washed desulfurized lead paste may be subjected to a step that reduces moisture content (e.g., the water content) before the thermal treatment such as filter pressing and/or heating with recycled process heat from the thermal treatment step.

Considered from a different perspective, the inventors have now discovered that electrochemical lead recovery processes, and especially continuous electrochemical lead recovery processes in which the electrolyte is recycled and reused, can be substantially improved by pretreatment of desulfurized lead paste to so avoid difficulties associated with electrolyte dilution and lead dioxide accumulation in the recycled electrolyte. Advantageously, pretreatment by thermally processing a lead paste having a water content of at least 10 wt % (e.g., 10 to 30 wt %) and a sulfate content of no more than 2.0 wt % is environmentally benign, can be performed in a continuous manner, and will produce a substantially dried and decomposed lead paste suitable for dissolution in a suitable electrolyte (e.g., an acid electrolyte such as sulfuric acid, methane sulfonic acid, fluoboric acid, etc., or an alkaline electrolyte such as concentrated NaOH solution). Preferably, the dried and decomposed lead paste after thermal processing has a water content equal to or less than 10 wt %. More preferably, the dried and decomposed lead paste after thermal processing has a water content of no more than 9.5 wt %, 9 wt %, 8.5 wt %, 8 wt %, 7.5 wt %, 7 wt %, 6.5 wt %, 6 wt %, 5.5 wt %, 5 wt %, 4.5 wt %, 4 wt %, 3.5 wt %, 3 wt %, 2.5 wt %, 2 wt %, 1.5 wt %, or 1 wt %. Most preferably, the dried and decomposed lead paste after thermal processing has a water content of no more than 5 wt % or no more than 2 wt %.

Furthermore, the dried and decomposed lead paste after thermal processing has at least 25% less lead dioxide than the lead paste prior to thermal processing. That is, the amount of lead dioxide of the thermally processed (e.g., heated) lead paste is reduced by at least 25%, and typically, the amount of lead dioxide of the thermally processed lead paste is reduced by at least 25%, at least 30%, at least 35%, at least 40%, at least 45%, at least 50%, at least 55%, at least 60%, at least 65%, at least 70%, at least 75%, at least 80%, at least 85%, at least 90 wt %, at least 95%, or at least 97% compared to the lead dioxide content of the lead paste prior to thermal processing. In addition to thermal processing, as disclosed herein, the pretreatment may also include washing of the lead paste in which the lead paste is a desulfurized or a non-desulfurized lead paste and is washed to remove residual solids (e.g., sulfates) prior to thermal processing.

In especially preferred methods, the pretreatment is a thermal pretreatment step in which the lead paste prior to thermal processing has a water content of at least 10 wt % (e.g., 10 to 30 wt %, 10 to 25 wt %, 10 to 20 wt %, 10 to 15 wt %, 12 to 15 wt %, 12 to 14 wt %, 12 to 13 wt %, 10 to 14 wt %, or 10 to 13 wt %). As will be readily appreciated, the water content can be adjusted by various manners such as filtration, filter pressing, centrifugation, solvent exchange, etc. In preferred embodiments, the washed lead paste prior to thermal processing has a water content of no more than 15 wt %, no more than 14 wt %, or no more than 13 wt %. The washed lead paste is then subjected to thermal dehydration and decomposition such that the treated paste will have a substantially reduced water content (e.g., 10 wt % or less, 9 wt % or less, 8 wt % or less, 7 wt % or less, 6 wt % or less, 5 wt % or less, less than 5 wt %, or less than 4 wt %, or less than 3 wt %, or less than 2 wt %) and substantially reduced lead dioxide content (e.g., less than 10 wt %, or less than 7 wt %, or less than 5 wt %, or less than 3 wt %). Typically, the thermal pretreatment reduces the amount of lead dioxide in the treated lead paste by at least 60%, by at least 70%, by at least 80%, by at least 90%, by at least 95%, or by at least 97% of all lead dioxide to an oxide other than lead dioxide (i.e., alpha $PbO_x$, beta $PbO_x$, (x<2) $Pb_3O_4$, PbO (tetragonal), PbO (orthorhombic)) compared to the lead dioxide of the lead paste prior to thermal processing.

Moreover, thermal pretreatment will in some instances also reduce the amount of plastic components by thermal decomposition. Most advantageously, contemplated thermal pretreatment eliminates the need to reduce lead dioxide that is insoluble in most electrolytes, and avoids electrolyte dilution. Viewed from a different perspective, relatively minor quantities of residual undissolved solids in an electrolyte which are combined with the pretreated paste are predominantly lead sulfate which can be readily subjected to a conventional desulfurization step—which may be either a part of the lead recovery operation or may be a separate process.

In one exemplary embodiment of the inventive subject matter as schematically shown in FIG. 1, a battery recycling plant will typically include a disassembly station in which the batteries are broken up and comminuted to suitable size for further processing. Such disassembly station will also perform an initial separation of the various components such that the liquid phase (predominantly sulfuric acid and dissolved species), grid lead, and plastic particles are removed using conventional separation methods. The remaining lead paste, predominantly comprising lead oxide, lead dioxide, and lead sulfate) can then be subjected to a desulfurization step. In exemplary aspects, the desulfurization is performed using a base such that lead sulfate is converted to insoluble lead hydroxide (or carbonate), thus forming soluble sodium sulfate. Most typically, lead dioxide is not reactive under these conditions and remains as an insoluble component. While such desulfurization step will remove a substantial proportion of lead sulfate, it should be appreciated that residual lead sulfate will remain in the paste as well as residual dissolved sodium sulfate (which in processes other than continuous processes using recycled electrolyte will typically not be problematic). A continuous process of lead recovery from a lead acid battery in which the electrolyte is recycled and the method is continuously repeated, may also be referred to as a "closed-loop process".

Upon removal of the predominant fraction of soluble sodium sulfate from the insoluble paste in a desulfurization process, the paste/precipitates are then subjected to a wash step that will typically involve re-slurrying the desulfurized paste with an aqueous solvent. As disclosed throughout, the wash step will advantageously reduce the sulfate concentration (and residual plastics content) in the washed paste. Where desired, the washed paste may then be subjected to a further step of moisture removal, typically in a filter press. Alternatively, or additionally, waste heat from the thermal treatment can be used to evaporate at least some of the water present in the washed paste. As should be readily appreciated, all removed water can be recycled to the plant and used in various process steps (e.g., as make-up water for new electrolyte) to reduce the overall water demand. Where desired or needed soluble sulfate salts in the wash water can be removed in numerous manners, including precipitation, crystallization, or via ion exchange.

Notably, in some embodiments, the thermal treatment is a continuous thermal treatment using a rotary kiln that is operated under conditions that allow for conversion of at least 25%, of at least 50%, of at least 60%, of at least 70%, of at least 80%, of at least 90%, of at least 95%, or of at least 97% of all lead dioxide to an oxide other than lead dioxide (i.e., alpha $PbO_x$, beta $PbO_x$, (x<2) $Pb_3O_4$, PbO (tetragonal), PbO (orthorhombic)). Preferably, the thermal treatment predominantly produces $Pb_3O_4$ and PbO (tetragonal), and most preferably predominantly PbO (tetragonal). For example, after preferred thermal treatment processes, residual lead dioxide is present at concentrations of equal or less than 10 wt %, equal or less than 8 wt %, equal or less than 6 wt %, equal or less than 4 wt %, equal or less than 2 wt %, or equal or less than 1 wt %, while at least 70 wt %, at least 80 wt %, at least 85 wt %, at least 90 wt %, or at least 95 wt % PbO (tetragonal) are formed from lead dioxide, with the remainder preferably $Pb_3O_4$ as the predominant lead oxide species. Viewed from a different perspective, at least 80%, at least 85%, at least 90%, of all lead dioxide will be converted to PbO (tetragonal) and/or $Pb_3O_4$. Advantageously, all of these non-lead dioxide species are soluble in alkane sulfonic acid (e.g., methane sulfonic acid) and as such can be subjected to electrochemical recovery in a process that does not require a chelator to solubilize lead sulfate. In addition, and especially where desulfurization and thermal decomposition are used, it should be appreciated that all so produced lead species are suitable for recycling to extinction in the processes described herein (i.e., residual quantities of insoluble lead sulfate can be fed to desulfurization operation, residual quantities of lead dioxide can be fed to thermal treatment, etc.)

To that end, the thermal treatment will typically entail heating the lead paste over a time and temperature sufficient to decompose lead dioxide to alpha $PbO_x$, beta $PbO_x$, ($x<2$) $Pb_3O_4$, PbO (tetragonal), and/or PbO (orthorhombic) and to evaporate most or all of the residual water. For example, and as is discussed in more detail below, suitable temperatures are at least about 190° C., or at least about 350° C., or at least about 400° C., or at least about 460° C., or at least about 530° C., or at least about 550° C., or at least about 560° C. Therefore, suitable heating temperature ranges will be between 350-550° C., or between 450-570° C., or between 480-580° C., or between 500-575° C. Suitable heating times can be readily determined using analysis of the heated material using various manners. However, as the different lead species will have distinct colors as is also shown in more detail below, heating temperatures and durations can be adjusted such as to achieve a predominantly yellow color of this dried decomposed lead paste, which is indicative of tetragonal lead oxide.

Notably the heating of the lead paste over a time and temperature sufficient to decompose lead dioxide may be carried out using any suitable heating process/technology. In exemplary embodiments, the heating of the lead paste is carried using batch heating, a fluidized bed reactor for continuous heating, a conveyor belt furnace, a moving heat source, or a rotating kiln. While any suitable heating process can be used and readily adapted for heating lead paste for removal of residual water and converting lead dioxide to lead oxide, a rotating kiln is preferred as this method is capable of breaking aggregates in the lead paste, which thereby releases moisture and increases the efficiency of water removal from the lead paste.

Once thermal treatment has reached a desired product composition (e.g., the dried decomposed lead paste), the treated lead paste is cooled and then dissolved as needed in a suitable solvent/electrolyte. While numerous electrolytes are well known in the art, it is generally preferred that the electrolyte is an alkane sulfonic acid (and especially methane sulfonic acid) or a strong base (at concentration sufficient to generate soluble plumbite). Upon dissolution of the treated lead paste, a lead ion enriched electrolyte is formed that is then subject to electrochemical reduction where lead ions are reduced at a cathode to form metallic lead. Most preferably, the cathode is a moving cathode (e.g., disk shaped cathode) on which lead is reduced on one portion and from which metallic lead is concurrently harvested at another portion of the cathode, typically as a micro- and nano-structured metallic lead product. Most typically, the so produced lead is high purity lead and has a purity of at least 95%, more typically at least 97%, or at least 98%, or at least 99%. Additionally, the recovered high purity lead has a density of less than 5 g/cm², of less than 4 g/cm², of less than 3 g/cm², or less than 2 g/cm². Especially preferred systems and methods for such lead production are described in US 2017/0352927, US 2018/0127852, and US 2018/0355494, incorporated by reference herein.

Thus, it should be recognized that a continuous electrochemical lead production process can be supplied with a pretreated lead paste that is also provided in a continuous manner. Once metallic lead has been recovered at a desired quantity, the electrolyte has a significantly reduced lead ion concentration (lead ion depleted electrolyte) and can be recycled to the process to dissolve further pretreated lead paste. Advantageously, addition of pretreated, dried decomposed lead paste will not significantly increase the amount of insoluble materials in the lead ion enriched solvent, nor will the pretreated lead paste provide any significant quantities of water or other fluid that would dilute the electrolyte.

More specifically, an effective concentration of electrolyte can be preserved and reused. That is, in view of the fact that the regenerated lead ion depleted electrolyte formed after electrochemical processing of the dried decomposed lead paste does not accumulate excess water or lead dioxide ($PbO_2$), the recycled electrolyte is capable of being used repeatedly on pretreated (e.g., kiln heated and optionally washed) dried decomposed lead paste for continuous recovery of metallic lead.

Of course, it should be noted that any solids can be removed from the lead ion enriched and/or from the recycled electrolyte (e.g., via settlement, centrifugation, filtration, etc.). As these solids will predominantly be residual lead sulfate and/or lead dioxide at minor quantities, these solids can be fed back to the overall process, either to the desulfurization operation and/or to the thermal pretreatment as is also shown in FIG. 1. Likewise, where the electrolyte comprises residual soluble sodium sulfate, it should be recognized that such sulfate can be readily removed in numerous manners, including precipitation, crystallization, and/or ion exchange.

In particular, the lead ion enriched electrolyte may further include residual solid grid lead and the method may further include filtering (after alkane sulfonic acid/MSA) to remove any residual solid grid lead.

EXAMPLES

Figure 2:
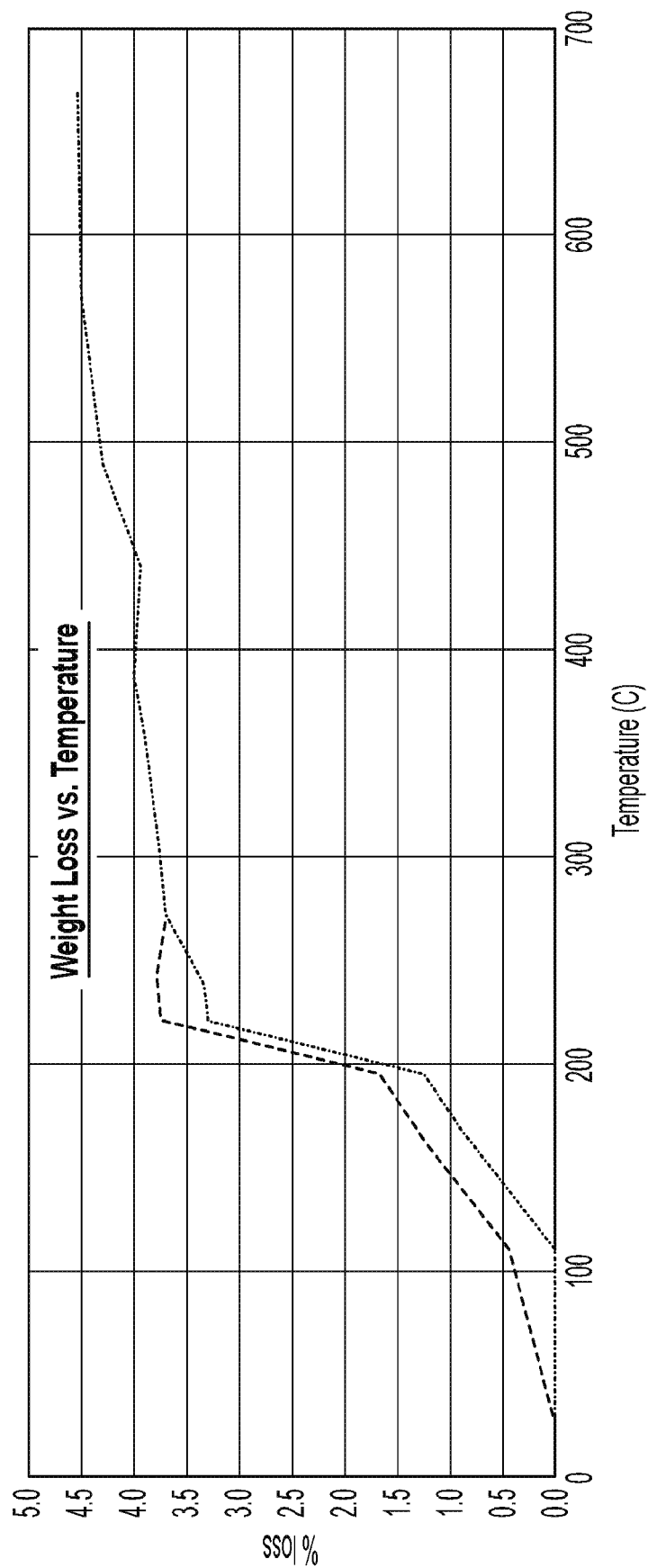
FIG. 2 is an exemplary graph depicting loss of moisture/weight as a function of various temperatures.
Figure 3:
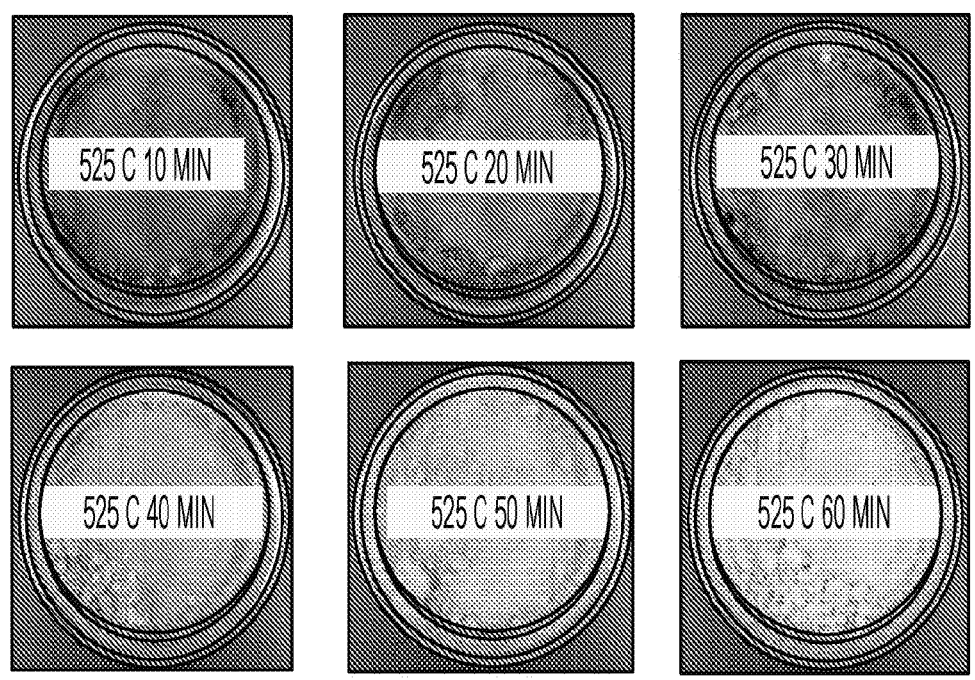
FIG. 3 is an exemplary photograph depicting various oxidation states of lead as a function of time over a specific temperature.
Figure 4:
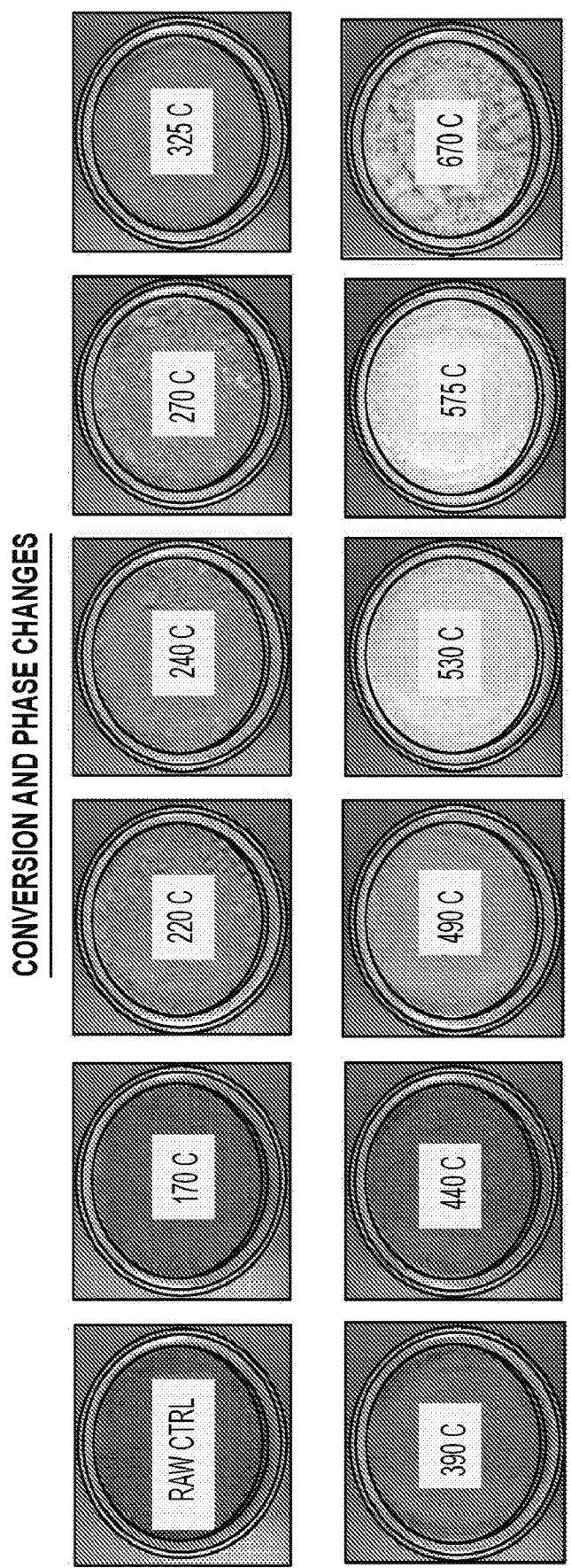
FIG. 4 is an exemplary photograph depicting various oxidation states of lead as a function of various temperatures.

In a first set of experiments, the inventors set out to determine heating conditions that will allow removal of moisture from lead paste (e.g., unwashed, washed, desulfurized, not desulfurized, or other), which typically is or comprises water or other aqueous solution from a washing step and/or desulfurization step. Paste was heated at 100-105° C., and evaporation of the liquid phase was measured in terms of weight loss. FIG. 2 depicts exemplary results across a temperature range of between 20-650° C. Notably, significant water removal occurred at temperatures in excess of 220° C., which is well above the boiling point of water. Advantageously, at such and higher temperatures, lead paste not only lost weight due to evaporation, but also underwent a distinct phase change that could also be observed at constant elevated temperatures over increasing time periods of heating. For example, FIG. 3 shows exemplary results of lead paste heated at an oven temperature of 525° C. in 10 min increments. As can be readily seen from the pictures, the color change over time was significant and indicative of a transition from $PbO$ ($1<x<2$) to PbO (tetragonal). Similarly, when different samples of desulfurized lead paste were subjected to different temperatures, respectively, oxidation states were easily distinguishable as is shown in FIG. 4, starting with raw lead paste and ending with PbO (orthorhombic at 670° C.).

Figure 5:
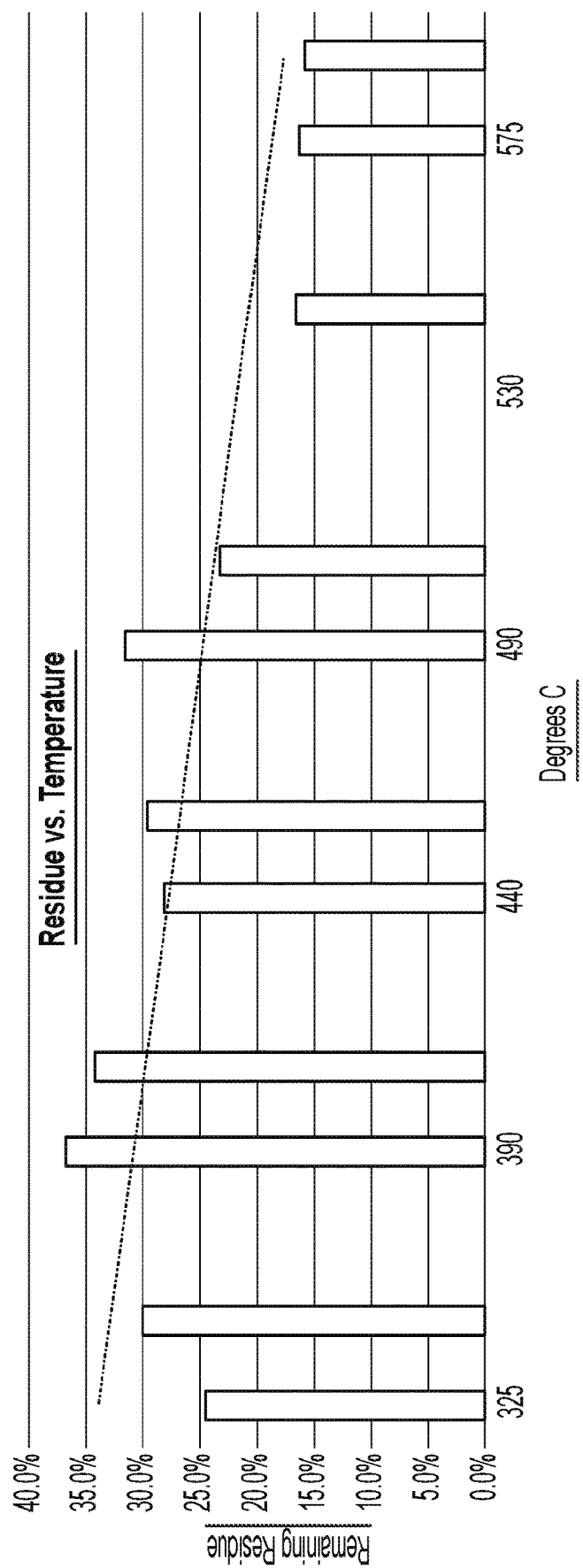
FIG. 5 is an exemplary graph depicting residue quantities in recycled electrolyte after dissolving thermally treated lead paste samples.
Figure 6:
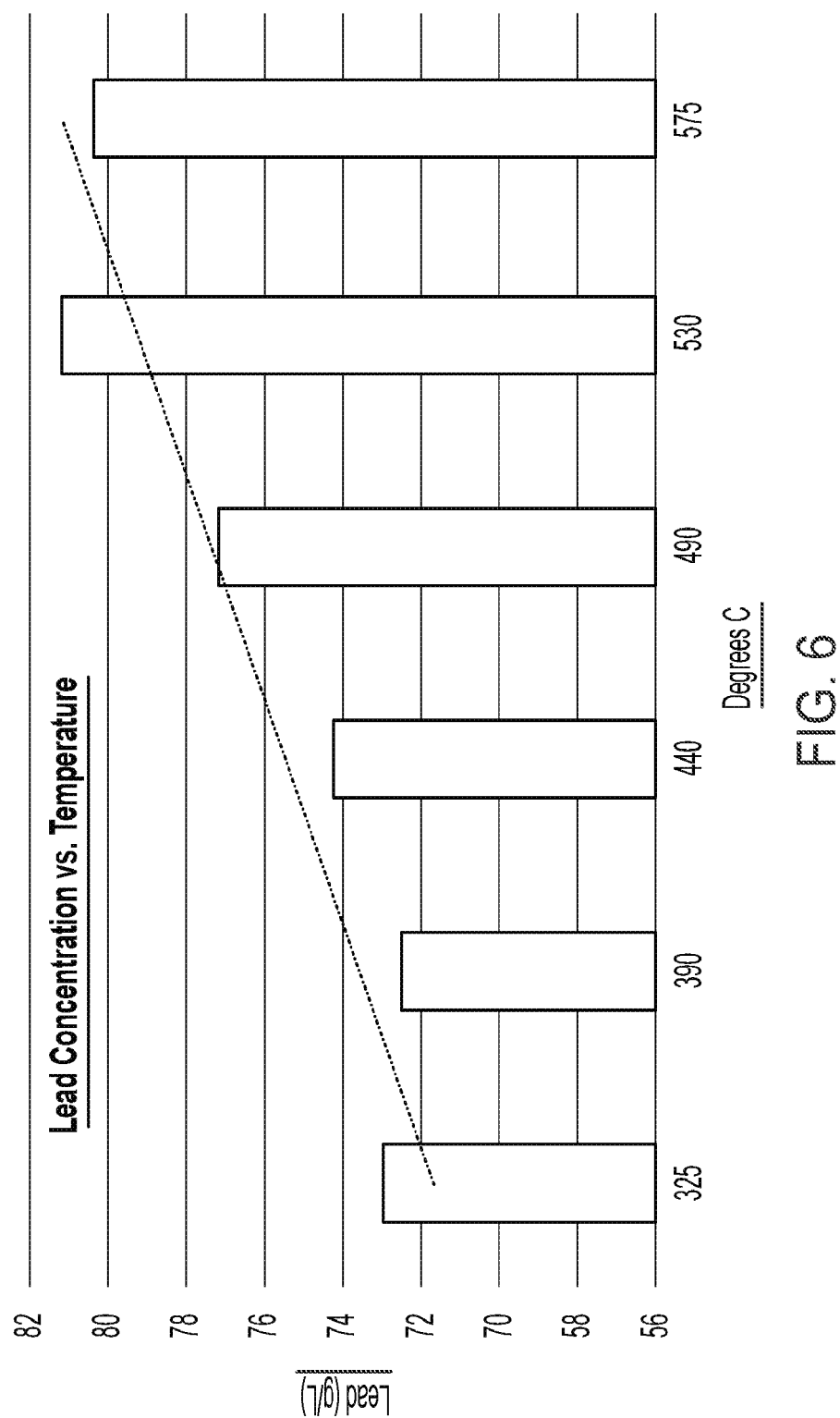
FIG. 6 is an exemplary graph depicting lead ion concentrations in recycled electrolyte after dissolving thermally treated lead paste samples.

The inventors then investigated whether different temperatures of lead paste treatment had an effect on dissolution/residuals of the so treated lead paste in an electrolyte, and especially in methane sulfonic acid. More specifically, samples at the different temperatures were digested with MSA. Here, 10 g of heat-treated material was added into 100 mL of 20% MSA and allowed to stir for one hour. The solids were filtered out and reweighed, and the filtrate was analyzed for dissolved lead ions. FIGS. 5 and 6 illustrate exemplary results. As can be readily taken from the data, heat treatment of lead paste at increasing temperatures significantly reduced the amount of undissolved residues (FIG. 5), while the amount of lead ions in MSA was dramatically increased (FIG. 6). Also of interest, two types of crystalline structures of PbO were identified, alpha and beta. At 529° C., the beta configuration along with lead oxide ($Pb_3O_4$) converted to PbO. At higher temperatures the tetragonal form transitioned to an orthorhombic configuration which is more compact and tightly bonded. This overall reconfiguration could be what was observed with material shrinkage in the 400° C. region, and eventual hardening in high-temperature furnace tests, exceeding 600° C. Therefore, temperatures of 600° C. are typically less preferred, while temperatures below 450° C. will produce lower quantities of electrolyte soluble lead forms. Using a similar approach as noted above, the following results were observed as listed in Table 1 below:

TABLE 1

| Temperature | | Recovery | | | Digestion | | | | Recovery |
| --- | --- | --- | --- | --- | --- | --- | --- | --- | --- |
| | | | | | Paste | Residue | % | Pb in | |
| Setting | Diff | Total | Ave | Loss | In | Left | Left | Conc | Ave | (g/L) |
| 220 | 50 | 96.3% | | | 10.0892 | | | 5.95 | | |
| | | 96.3% | 96.27% | 3.7% | 10.0137 | | | 6.14 | 6.0 | 60 |
| 240 | 20 | 96.2% | | | 10.0982 | | | 5.95 | | |
| | | 96.2% | 96.23% | 3.8% | 10.0137 | | | 6.07 | 6.0 | 60 |
| 270 | 30 | 96.2% | | | 10.0162 | | | 5.92 | | |
| | | 96.4% | 96.32% | 3.7% | 10.0887 | | | 5.98 | 6.0 | 60 |
| 325 | 55 | 96.2% | | | 10.0064 | 2.4439 | 24.42% | 7.7 | | |
| | | 96.1% | 96.18% | 3.8% | 10.0017 | 2.9769 | 29.76% | 7.3 | 7.5 | 75 |
| 390 | 65 | 96.0% | | | 10.0041 | 3.678 | 36.76% | 7.3 | | |
| | | 96.0% | 96.02% | 4.0% | 10.0037 | 3.4374 | 34.36% | 7.2 | 7.3 | 73 |
| 440 | 50 | 96.1% | | | 10.002 | 2.8116 | 28.11% | 7.3 | | |
| | | 96.1% | 96.06% | 3.9% | 10.0027 | 2.9569 | 29.56% | 7.6 | 7.4 | 74 |
| 490 | 50 | 95.7% | | | 10.0013 | 3.1816 | 31.81% | 7.5 | | |
| | | 95.7% | 95.71% | 4.3% | 10.0044 | 2.3318 | 23.31% | 8.0 | 7.7 | 77 |
| 530 | 40 | 95.6% | | | 10.0042 | | | | | |
| | | 95.6% | 95.59% | 4.4% | 10.0098 | 1.6658 | 16.64% | 8.1 | 8.1 | 81 |
| 575 | 45 | 95.5% | | | 10.001 | 1.6399 | 16.40% | 8.0 | | |
| | | 95.5% | 95.50% | 4.5% | 10.039 | 1.5835 | 15.77% | 8.1 | 8.0 | 81 |
| 670 | 95 | 95.5% | | | 10.076 | | | 6.1 | | |
| | | 95.5% | 95.47% | 4.5% | 10.113 | | | 6.1 | 6.1 | 61 |
| Pure | | | | | 10.0455 | | | 9.1 | | |

Based on the above batch results in Table 1, the inventors then investigated various continuous heat treatment options, and especially use of a rotary kiln with a feed end receiving desulfurized lead paste and a discharge end that released the heat-treated lead paste. An exemplary rotary calciner (kiln) had a rotary shell, tires, trunnion wheel assemblies, thrust rollers, feed/discharge breechings with purge type rotary expansion bellows seals, variable speed chain drive, unitary base frame with adjustable slope, electric furnace, water spray cooler, removable shell flight cartridge, removable feed/discharge external knockers, removable internal scraper, removable bed thermocouple assembly, removable feed dam with spiral flighting, screw feeder with hopper, emission control equipment and control instrumentation.

The rotary shell size was 7¼" O.D.×6½" I.D.×11'-3" overall length and included a 6'-8" long heating section and a 3'-0" long cooling section. The shell was constructed of centrifugally cast type HH alloy. Heat was supplied indirectly via radiation and conduction as the primary modes of heat transfer by a 54 kW electric furnace having four independent zones of temperature control. The electric furnace included heating elements mounted in the furnace fiber insulation and was designed to allow accurate temperature profiling over the heated length of the kiln. Shell zone temperatures were maintained at their design setpoints by measuring the shell zone temperature for each of the four zones via Type K thermocouples and controlling the amperage via SCR controllers to the zone heating elements. Cooling was supplied by indirect water spray on the exterior surface of the shell. The water spray was contained by a housing surrounding the shell equipped with top spray manifold, bottom drain connection and labyrinth end seals. The shell was supported by two tires, each riding on a set of two trunnion wheels. Each of the trunnion wheel shaft bearings were mounted on an adjustable pad which was attached to the unitary base frame. Thrust rollers were located on both sides of the feed end tire and were mounted on adjustable pads which were attached to the unitary base. Thrust rollers held the shell in its proper longitudinal position. The material retention time in the kiln was controlled by the slope and speed of the shell. The shell slope was adjustable by pivoting the support base frame to the desired position.

In addition to providing an optional inert sweep gas through the shell, the following areas of the equipment can be purged with inert gas: feed & discharge bellows seals, feed & discharge seal mating surfaces, feeder, product collection drum and observation port. Purge gas (air) is most often used to minimize oxidation of solids and prevent off gas ignition. The purge gas can be metered by a rotameter and delivered by a valve manifold connected to two supply sources (typically 12 cylinder clusters), one on-line and one ready, to allow uninterrupted purge flow. The emission control equipment included a flare hood, tar drop, water jacket condenser, venturi water spray scrubber, packed bed scrubber, cyclone, baghouse, exhaust fan and interconnecting ductwork. The sweep gas was pulled through the kiln and emission equipment and discharged to the atmosphere.

When the feedstock material was heated, the surface moisture first evaporated and then the lead hydroxide and dioxide were converted to form lead oxide. The calcined material went through multiple color changes from red to orange to yellow when the highest quality product is achieved at a 530° C. (+/−7 degrees) target product temperature. If the calcined material is overheated, then the material color returns back to orange and becomes less friable.

For exemplary operation, the rotary kiln was arranged for counter-current operation, the shell rotational speed was set at 5 rpm, and the shell slope was set at 0.8 Deg (degrees) to achieve the estimated retention time. The feed rate was held constant over all test trials. The shell zone temperatures were adjusted to achieve the desired color characteristic of the 530° C. target product temperature. At steady state, the following results were obtained as shown in Table 2 below.

TABLE 2

Process summary - discharge end:

| | Trial | | | | |
|---|---|---|---|---|---|
| Run Time | 1<br>1145 AM | 2<br>1215 PM | 3<br>1245 PM | 4<br>130 PM | 5<br>345 PM |
| Shell Speed (RPM) | 5 | 5 | 5 | 5 | 5 |
| Shell Slope (Deg) | 0.8 | 0.8 | 0.8 | 0.8 | 0.8 |
| Shell Zone Temperature: | | | | | |
| Zone 1 (Deg C.) | 560 | 560 | 560 | 560 | 640 |
| Zone 2 (Deg C.) | 560 | 560 | 560 | 560 | 640 |
| Zone 3 (Deg C.) | 560 | 580 | 600 | 600 | 640 |
| Zone 4 (Deg C.) | 560 | 580 | 600 | 640 | 640 |
| Feed Rate, Wet Basis (lb/hr) | 40 | 40 | 40 | 40 | 40 |
| Feed Temperature | Ambient | Ambient | Ambient | Ambient | Ambient |
| Feed Moisture, Wet Basis (wt %) | 17.0 | 20.2 | | 18.1 | |
| Feed Bulk Density (lb/ft3) | 126 | | | | |
| Product Rate, Wet Basis (lb/hr) | | | | 26.4 | |
| Product Moisture, Wet Basis | Nil | Nil | Nil | Nil | Nil |
| Product Color | Red Orange | Orange | Yellow Orange | Yellow | Yellow Orange |
| Product Bulk Density (lb/ft3) | | | | 180 | |
| Offgas Temperature (Deg C.) | | | | 375 | |
| Material Sticking | None | None | Light Coating Zone 3 Zone 4 | Light Coating Zone 3 Zone 4 | Light Coating Zone 3 Zone 4 |
| Internal Star Bar | Yes | Yes | Yes | Yes | No |
| Small Sample Collected | No | No | No | Sample 2 | Sample 3 |
| Large Sample Collected | No | No | No | 30.7 lbs | No |

TABLE 3

Process summary - feed end:

| | Trial | | | | | |
|---|---|---|---|---|---|---|
| Run Time | 1<br>915 AM | 2<br>1015 AM | 3<br>1200 PM | 4<br>100 PM | 5<br>200 PM | 6<br>435 PM |
| Shell Speed (RPM) | 5 | 5 | 5 | 5 | 5 | 5 |
| Shell Slope (Deg) | 0.8 | 0.8 | 0.8 | 0.8 | 0.8 | 0.8 |
| Shell Zone Temperature: | | | | | | |
| Zone 1 (Deg C.) | 660 | 690 | 730 | 770 | 815 | 730 |
| Zone 2 (Deg C.) | 610 | 640 | 680 | 720 | 765 | 680 |
| Zone 3 (Deg C.) | 580 | 595 | 630 | 655 | 680 | 630 |
| Zone 4 (Deg C.) | 560 | 560 | 560 | 560 | 575 | 560 |
| Feed Rate, Wet Basis (lb/hr) | 40 | 40 | 40 | 40 | 40 | 40 |
| Feed Temperature | Ambient | Ambient | Ambient | Ambient | Ambient | Ambient |
| Feed Moisture, Wet Basis (wt %) | 16.2 | | | | 15.7 | 16.6 |
| Feed Bulk Density (lb/ft3) | 126 | | | | | |
| Product Rate, Wet Basis (lb/hr) | | | | | | 29.7 |
| Product Moisture, Wet Basis | Nil | Nil | Nil | Nil | Nil | Nil |
| Product Color | Orange | Orange | Yellow | Yellow Orange | Yellow Orange | Yellow |
| Product Bulk Density (lb/ft3) | | | | | | 190 |
| Offgas Temperature (Deg C.) | | | | | | 450 |
| Material Sticking | None | None | None | None | Heavy Coating Zone 1 Zone 2 | None |
| Internal Star Bar | No | No | No | No | No | Yes |
| Small Sample Collected | No | No | Sample 4 | No | No | Samples 5A 5B 6 |
| Large Sample Collected | No | No | No | No | No | 29.7 lbs |

With reference to Tables 2 and 3, desirable results were achieved where the feed material was reduced in size (e.g., to below 1" maximum size), where the shell temperature at the furnace discharge end was restricted to 580° C. maximum and operated at 560° C. normal, and where the shell temperature at the furnace feed end was restricted to 770° C. maximum and operated at 730° C. normal. These conditions were typical to achieve an overall yellow colored product that exited the kiln at about 520-530° C. with a predominant PbO (tetragonal) content (i.e., $PbO_2$ to PbO conversion at least 60 mol %, or at least 70 mol %, or at least 80 mol %, or at least 85 mol %, or at least 90 mol %). Accordingly, the washed lead paste feed material has a size that is not more than 1 inch for any of its dimensions, regardless of its shape.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Moreover, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of preserving an electrolyte in an electrochemical lead recovery operation that recovers metallic lead from desulfurized lead paste of a lead acid battery, comprising:
   providing the desulfurized lead paste, wherein the desulfurized lead paste comprises lead dioxide, lead hydroxide, and/or lead carbonate, and further comprises residual sulfate;
   washing the desulfurized lead paste thereby forming a washed desulfurized lead paste comprising residual water;
   heating the washed desulfurized lead paste to reduce the residual water to equal or less than 10 wt % and to reduce at least 25% of the lead dioxide to lead oxide, thereby forming a dried decomposed desulfurized lead paste;
   combining the dried decomposed desulfurized lead paste with a recycled electrolyte to form a lead ion enriched electrolyte; and
   subjecting the lead ion enriched electrolyte to the electrochemical lead recovery operation to thereby recover metallic lead on a cathode and generate the recycled electrolyte.

2. The method of claim 1, wherein the desulfurized lead paste is desulfurized using an aqueous base.

3. The method of claim 1, wherein the residual sulfate in the desulfurized lead paste is present in an amount of between 0.1-10 wt %.

4. The method of claim 1, wherein the washing with water removes at least 70% of the residual sulfate from the desulfurized lead paste.

5. The method of claim 1, further comprising removing the residual water from the washed desulfurized lead paste.

6. The method of claim 1, wherein the step of heating the washed desulfurized lead paste reduces the residual water to equal or less than 5 wt % of the dried decomposed desulfurized lead paste.

7. The method of claim 1, wherein the step of heating the washed desulfurized lead paste reduces at least 70% of the lead dioxide present in the washed desulfurized lead paste to lead oxide.

8. The method of claim 1, wherein the step of heating is performed in a kiln such that the dried decomposed desulfurized lead paste has a temperature of between 400-700° C. at the end of the heating.

9. The method of claim 1, wherein the step of heating is performed in a kiln such that the dried decomposed desulfurized lead paste has a temperature of 500-560° C. at the end of the heating.

10. The method of claim 1, wherein the step of heating is performed until the dried decomposed desulfurized lead paste has a temperature of 500-560° C., and wherein the step of heating is performed such that the dried decomposed desulfurized lead paste is maintained at a temperature of 500-560° C. for a time of between 0-10 minutes.

11. The method of claim 1, wherein the recycled electrolyte comprises an alkane sulfonic acid.

12. The method of claim 1, wherein the electrochemical lead recovery operation uses a moving cathode.

13. The method of claim 1, wherein the electrochemical lead recovery operation includes a step of reducing the lead ions on one portion of a cathode while at the same time metallic lead is removed from another portion of the cathode.

14. The method of claim 1, further comprising a step of removing solids from the lead ion enriched electrolyte and/or the recycled electrolyte, wherein the solids comprise at least one of lead dioxide, lead sulfate, and grid lead.

15. The method of claim 1, wherein the metallic lead has a purity of at least 95%.

16. The method of claim 1, wherein the metallic lead has a density of less than 5 g/cm$^3$.

17. A method of reducing lead dioxide build-up in an electrochemical lead recovery operation that recovers metallic lead from lead paste of a lead acid battery, and that uses and recycles an electrolyte in which lead dioxide is insoluble, comprising:
   providing the lead paste, wherein the lead paste comprises lead dioxide and no more than 2.0 wt % of sulfate;
   heating the lead paste to reduce at least 50% of the lead dioxide to lead oxide, thereby forming a decomposed lead paste;
   combining the decomposed lead paste with a recycled electrolyte to form a lead ion enriched electrolyte; and subjecting the lead ion enriched electrolyte to an electrochemical lead recovery operation to thereby recover metallic lead on a cathode and generate the recycled electrolyte.

18. The method of claim 17, wherein the lead paste is a desulfurized lead paste.

19. A method of preserving an effective concentration of an electrolyte and reducing lead dioxide build-up in the electrolyte in a continuous electrochemical lead recovery operation that recovers metallic lead from desulfurized lead paste of a lead acid battery, comprising:

providing the desulfurized lead paste, wherein the desulfurized lead paste comprises lead dioxide, lead hydroxide, and/or lead carbonate, and further comprises residual sulfate;

washing the desulfurized lead paste thereby forming a washed desulfurized lead paste comprising residual water present in the desulfurized lead paste of between about 10 wt % to 30 wt %;

heating the washed desulfurized lead paste to reduce the residual water to equal or less than 10 wt % and to reduce at least 50% of the lead dioxide to lead oxide, thereby forming a dried decomposed desulfurized lead paste;

combining the dried decomposed desulfurized lead paste with the electrolyte to form a lead ion enriched electrolyte; and subjecting the lead ion enriched electrolyte to the electrochemical lead recovery operation to thereby recover metallic lead on a cathode and generate a recycled electrolyte.

20. The method of claim 19, wherein the residual sulfate in the desulfurized lead paste is present in an amount of between 0.1-10 wt %.

* * * * *